(12) United States Patent
Sayama (10) Patent No.: US 11,168,754 B2
(45) Date of Patent: Nov. 9, 2021

(54) PARKING MECHANISM

(71) Applicant: SUBARU CORPORATION, Tokyo (JP)

(72) Inventor: Daisuke Sayama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 128 days.

(21) Appl. No.: 16/597,025

(22) Filed: Oct. 9, 2019

(65) Prior Publication Data

US 2020/0166095 A1    May 28, 2020

(30) Foreign Application Priority Data

Nov. 27, 2018 (JP) .............................. JP2018-221137

(51) Int. Cl.
| | |
|---|---|
| *F16D 65/16* | (2006.01) |
| *B60T 1/06* | (2006.01) |
| *B60T 11/10* | (2006.01) |
| *F16H 63/34* | (2006.01) |
| *F16D 121/04* | (2012.01) |

(52) U.S. Cl.
CPC ............... *F16D 65/16* (2013.01); *B60T 1/06* (2013.01); *B60T 11/10* (2013.01); *F16H 63/34* (2013.01); *F16D 2121/04* (2013.01)

(58) Field of Classification Search
CPC .... F16D 63/006; F16D 65/16; F16D 2125/28; F16D 2125/64; F16D 2125/70; B60T 1/005; B60T 1/06

See application file for complete search history.

(56) References Cited

U.S. PATENT DOCUMENTS

| | | | | |
|---|---|---|---|---|
| 2,974,752 | A * | 3/1961 | Howard | .............. F16H 63/3475 |
| | | | | 188/69 |
| 3,900,082 | A * | 8/1975 | Sakamoto | ............... B60T 1/005 |
| | | | | 188/69 |
| 4,518,066 | A * | 5/1985 | Barr | ........................ B60T 1/005 |
| | | | | 188/31 |

(Continued)

FOREIGN PATENT DOCUMENTS

| | | | |
|---|---|---|---|
| CN | 110360316 A | * | 10/2019 |
| JP | 2017-101754 A | | 6/2017 |

(Continued)

*Primary Examiner* — Thomas J Williams
(74) *Attorney, Agent, or Firm* — Smith, Gambrell & Russell, LLP (57) ABSTRACT

A parking mechanism in a vehicle includes a parking gear, a parking piston, a parking rod, a parking pawl, and a locking lever. The parking gear is coupled to a drive shaft. The parking piston is moved between parking and non-parking position. The parking piston has a locking groove. The parking rod is moved in conjunction with movement of the parking piston. The parking pawl engages with and stops engaging with the parking gear in accordance with a move position of the parking rod. The locking lever includes first and second engagement portions. The first engagement portion engages with the locking groove when the parking piston is moved to the parking position. The second engagement portion engages with the locking groove when the parking piston is moved to the non-parking position. The locking lever selectively locks the parking piston in the parking and non-parking position.

12 Claims, 7 Drawing Sheets

(56) References Cited

U.S. PATENT DOCUMENTS

| | | | | |
|---|---|---|---|---|
| 4,576,261 | A * | 3/1986 | Barr | B60T 1/005 |
| | | | | 192/219.5 |
| 11,009,128 | B2 * | 5/2021 | Kwon | F16D 63/006 |
| 2008/0127772 | A1 * | 6/2008 | Sauter | F16H 63/3416 |
| | | | | 74/575 |
| 2014/0190784 | A1 * | 7/2014 | Yokota | F16H 63/3416 |
| | | | | 192/219.5 |
| 2016/0082933 | A1 * | 3/2016 | Iwata | F16D 65/28 |
| | | | | 188/163 |
| 2016/0244031 | A1 * | 8/2016 | Kidokoro | F16H 63/3483 |
| 2017/0001604 | A1 * | 1/2017 | Al-Regib | F16H 63/3483 |
| 2017/0219098 | A1 * | 8/2017 | Kokubu | F16D 63/006 |
| 2018/0141525 | A1 * | 5/2018 | Tateno | B60T 7/104 |
| 2020/0114884 | A1 * | 4/2020 | Kawanishi | B60T 7/102 |

FOREIGN PATENT DOCUMENTS

| | | | | |
|---|---|---|---|---|
| JP | 2017-144844 A | | 8/2017 | |
| JP | 2020046040 A | * | 3/2020 | B60T 1/062 |

* cited by examiner

PARKING MECHANISM

CROSS-REFERENCE TO RELATED APPLICATIONS

The present application claims priority from Japanese Patent Application No. 2018-221137 filed on Nov. 27, 2018, the entire contents of which are hereby incorporated by reference.

BACKGROUND

The disclosure relates to a technical field of a parking mechanism to lock a parking gear coupled to a drive shaft of a vehicle.

In a vehicle with an automatic transmission, a shift lever is operated to select a range from, for example, a parking range (P range), a reverse range (R range), a neutral range (N range), and a drive range (D range). In some vehicles, a parking switch is operated to select the parking range.

The parking range is a range to keep the vehicle stopped. When the shift lever or such a component is operated to select the parking range, rotation of the drive shaft is restricted to stop rotation of drive wheels.

Operation of a parking mechanism shifts the vehicle to the parking range or releases the vehicle from the parking range. The parking mechanism includes a parking gear coupled to the drive shaft, a parking pawl to restrict rotation of the parking gear, and a parking rod to operate the parking pawl. The parking pawl includes an engagement portion to engage with the parking gear.

When operation to select the parking range is performed, the parking rod is moved in a predetermined direction. In accordance with the movement of the parking rod, the parking pawl is moved toward the parking gear and the engagement portion engages with the parking gear to restrict rotation of the parking gear. When the rotation of the parking gear is restricted, the rotation of the drive shaft is restricted to stop rotation of the drive wheels, so that the vehicle shifts to the parking range.

When operation to select any of the ranges other than the parking range is performed, the parking rod is moved in a direction reverse to the predetermined direction. In accordance with the movement of the parking rod, the parking pawl is moved away from the parking gear and the engagement portion is released from the parking gear to stop restricting the rotation of the parking gear. When the restriction of the rotation of the parking gear is stopped, restriction of the rotation of the drive shaft is stopped to allow the drive wheels to rotate, so that the vehicle shifts to the selected range other than the parking range.

SUMMARY

An aspect of the disclosure provides a parking mechanism to be used in a vehicle. The parking mechanism includes a parking gear, a parking piston, a parking rod, a parking pawl, and a locking lever. The parking gear is configured to be coupled to a drive shaft. The parking piston is configured to be moved between a parking position to shift the vehicle to a parking range and a non-parking position to shift the vehicle to a non-parking range. The parking piston has a locking groove. The parking rod is configured to be moved in conjunction with movement of the parking piston. The parking pawl includes an engagement portion engageable with the parking gear. The parking pawl is configured to engage with and stop engaging with the parking gear in accordance with a move position of the parking rod. The locking lever includes a first engagement portion and a second engagement portion. The first engagement portion is configured to engage with the locking groove when the parking piston is moved to the parking position. The second engagement portion is configured to engage with the locking groove when the parking piston is moved to the non-parking position. The locking lever is configured to selectively lock the parking piston in the parking position and the non-parking position.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

In vehicles, generally, a parking rod is moved by hydraulic pressure. In case of a malfunction in a hydraulic mechanism, normal operation of the parking rod may be hindered, which may result in unintentional range shift.

In order to prevent unintentional range shift, some vehicles with a parking mechanism include a locking mechanism to maintain a state in which the vehicle has shifted to the parking range and a state in which the vehicle has shifted to any of the ranges other than the parking range (for example, Japanese Unexamined Patent Application Publication (JP-A) No. 2017-101754 and JP-A No. 2017-144844).

Space is used to install the above-described parking mechanism in the vehicle. Since the parking mechanism includes a large number of components moved in different predetermined directions, the installation space including space for movement is likely to increase. Desirably, the parking mechanism has a simple structure.

It is desirable to simplify the structure and reduce the installation space.

A parking mechanism 1 is disposed in a power transmission apparatus including an automatic transmission mechanism in a vehicle. For example, the power transmission apparatus is disposed vertically in the vehicle, and an axial direction of a drive shaft substantially coincides with a fore-and-aft direction of the vehicle.

In the vehicle, an operator such as a driver operates a shift lever to select a range from, for example, the parking range (P range), the reverse range (R range), the neutral range (N range), and the drive range (D range). In some vehicles, a parking switch is operated to select the parking range.

The parking range is a range to park the vehicle. The reverse range is a range to make the vehicle travel rearward. The neutral range is a range to interrupt power transmission from a power source such as an engine to the drive shaft. The drive range is a range to make the vehicle travel forward. The parking range and the neutral range are equivalent to non-travel ranges, and the reverse range and the drive range are equivalent to travel ranges.

The shift lever has shift positions respectively determined to select the parking range, the reverse range, the neutral range, and the drive range. The parking range is selected by operating the shift lever to a parking shift position. Alternatively, the parking range may be selected by operating the parking switch.

Figure 1:
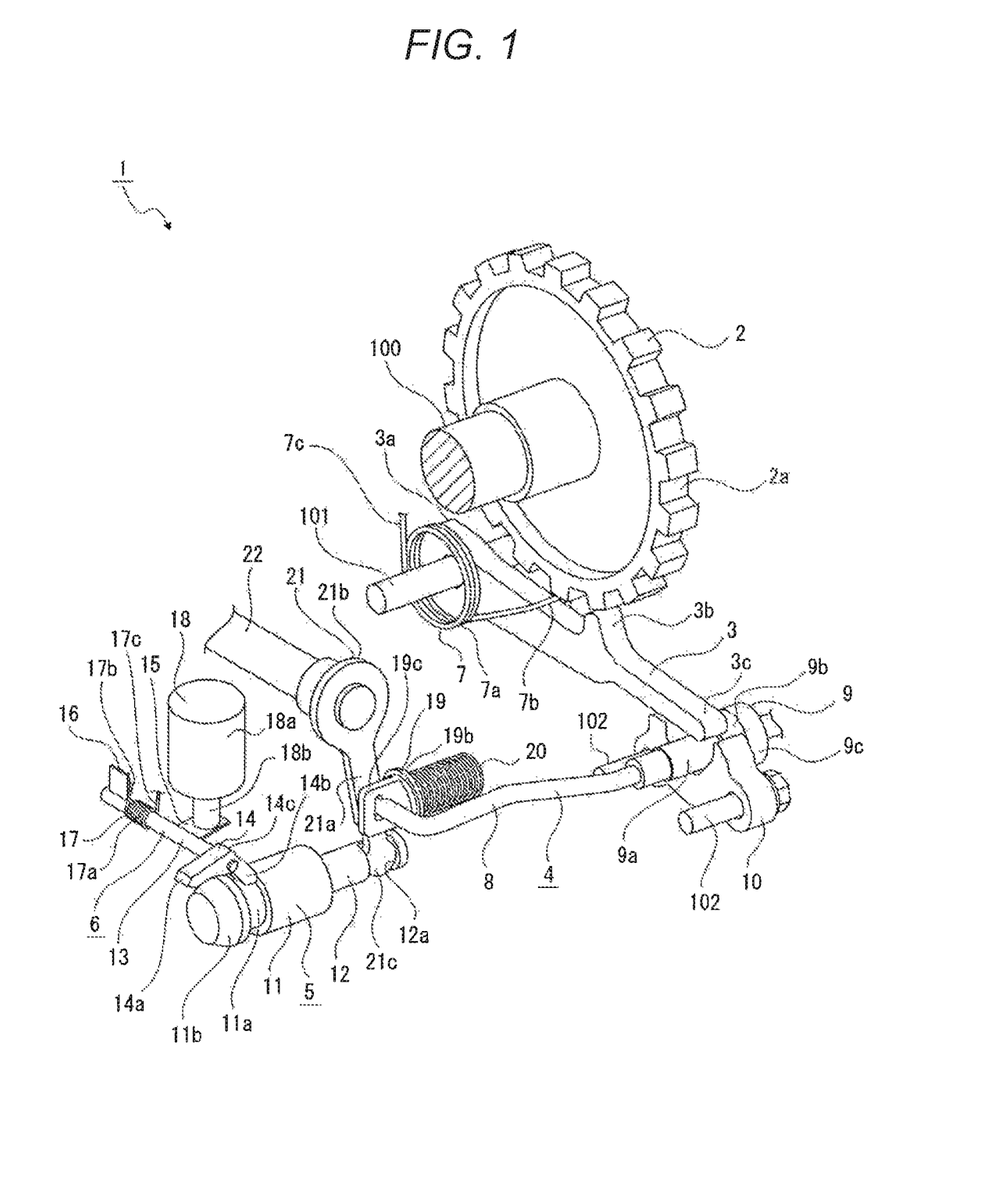
FIG. 1 is a perspective view of a parking mechanism according to an embodiment of the disclosure, illustrating the parking mechanism along with FIGS. 2 and 7.
Figure 2:
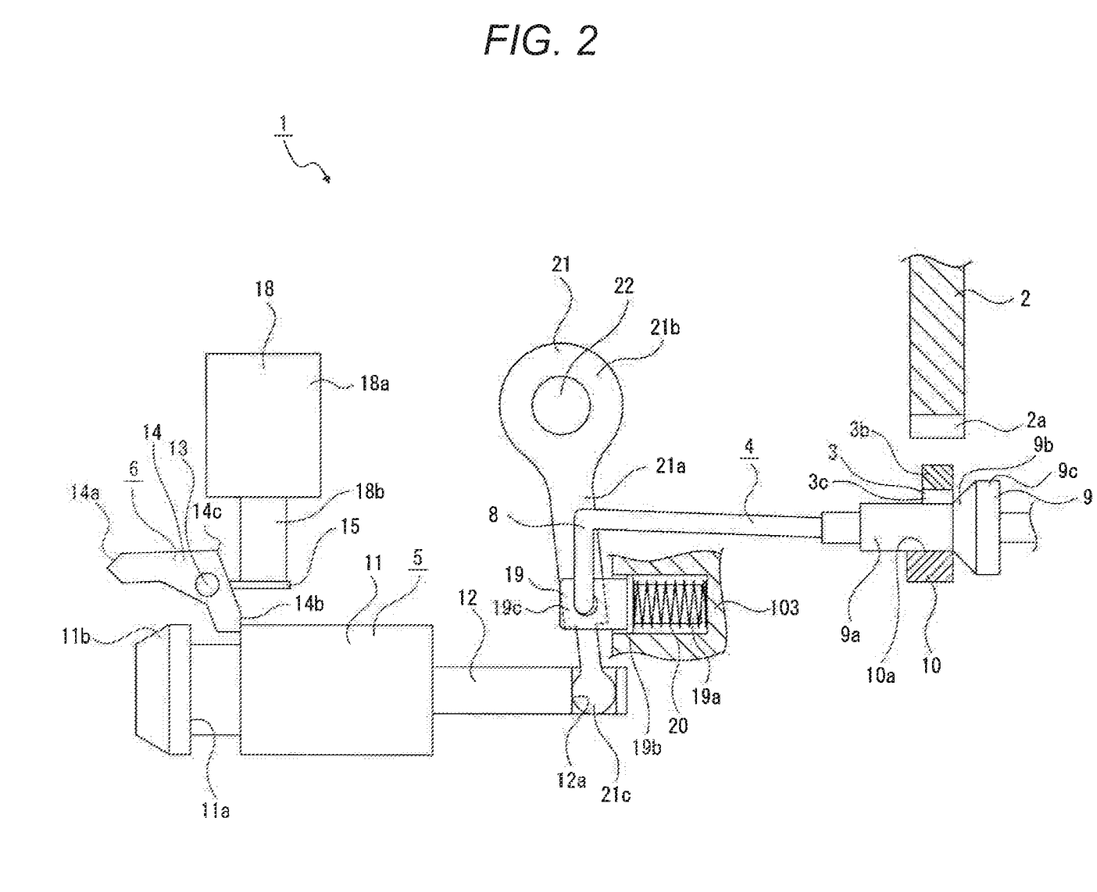
FIG. 2 is a side view of the parking mechanism in a state of a non-parking range.

The parking mechanism 1 includes a parking gear 2 coupled to a drive shaft 100, a parking pawl 3 engageable with the parking gear 2, a parking rod 4 to operate the parking pawl 3, a parking piston 5 to operate in conjunction with the parking rod 4, and a locking lever 6 to restrict movement of the parking piston 5 (see FIGS. 1 and 2).

The parking gear 2 is supported in a rotatable manner in a transmission case not illustrated, and is a flat gear having an outer peripheral portion as a gear portion 2a. The parking gear 2 has a center portion coupled to the drive shaft 100. Consequently, the parking gear 2 is rotated in accordance with rotation of the drive shaft 100 during travel of the vehicle, and stops rotation during non-travel of the vehicle. The drive shaft 100 is coupled to drive wheels, not illustrated, with a differential mechanism, for example.

The parking pawl 3 has a shape extending laterally. A pivot 101 is coupled to one end of the parking pawl 3 in a longitudinal direction. The one end of the parking pawl 3 in the longitudinal direction serves as a fulcrum 3a. The pivot 101 is coupled to the transmission case. Consequently, the parking pawl 3 is turned about the pivot 101 and moved substantially vertically relative to the transmission case.

The parking pawl 3 has an engagement portion 3b protruding upward. The engagement portion 3b is disposed right under the parking gear 2. The parking pawl 3 is turned toward the parking gear 2 to engage the engagement portion 3b with the parking gear 2. The parking pawl 3 is turned away from the parking gear 2 to release the engagement between the engagement portion 3b and the parking gear 2. The other end of the parking pawl 3 in the longitudinal direction serves as a cam operating portion 3c.

A return spring 7 is supported around the pivot 101. The return spring 7 is, for example, a torsion coil spring and has a coil 7a into which the pivot 101 is inserted. A first end portion 7b of the return spring 7 on one side engages with the parking pawl 3 from above. A second end portion 7c of the return spring 7 on the other side engages with a spring holder, not illustrated, of the transmission case. Consequently, the return spring 7 applies urging force to the parking pawl 3 to turn the parking pawl 3 in a direction to move the engagement portion 3b away from the parking gear 2.

The parking rod 4 includes a coupler 8 and a cam 9. The coupler 8 is a shaft member having a predetermined shape. The cam 9 is continuous to a rear end of the coupler 8. The coupler 8 has a front end portion bent substantially perpendicular to the rest of the coupler 8. The cam 9 includes a first acting portion 9a, a move portion 9b, and a second acting portion 9c. The first acting portion 9a is continuous to the coupler 8. The move portion 9b gradually increases in diameter as a distance from the first acting portion 9a increases. The second acting portion 9c is continuous to the move portion 9b. The second acting portion 9c has a larger diameter than the first acting portion 9a has.

The cam 9 of the parking rod 4 is supported by a support member 10 in such a manner the cam 9 is movable in the fore-and-aft direction. The support member 10 is secured to the transmission case with bolts 102, 102, and has a support recess 10a opened upward. In movement, the parking rod 4 is slid on the support member 10, with the cam 9 being inserted into the support recess 10a.

The parking piston 5 is moved in the fore-and-aft direction between a parking position and a non-parking position. Hydraulic pressure is applied to move the parking piston 5 rearward to the non-parking position. The application of the hydraulic pressure is stopped to move the parking piston 5 forward to the parking position. It is noted that hydraulic pressure is applied to the parking piston 5 with, for example, a hydraulic mechanism, not illustrated, including a solenoid. The parking position is a position for the vehicle to shift to the parking range. The non-parking position is a position for the vehicle to shift to non-parking ranges other than the parking range.

When the shift lever is operated to the parking shift position or when the parking switch is operated, a first signal is transmitted to a control circuit, not illustrated, via a signal line so as to stop the application of the hydraulic pressure and move the parking piston 5 from the non-parking position to the parking position.

When the shift lever is operated to a position other than the parking shift position or when the parking switch is turned off, a second signal is transmitted to the control circuit via the signal line so as to apply hydraulic pressure and move the parking piston 5 from the parking position to the non-parking position.

In this manner, in the parking mechanism 1, under what is called shift-by-wire control based on the transmitted signal, the parking piston 5 is moved between the parking position and the non-parking position.

The parking piston 5 includes an acting member 11 and a shaft 12. The shaft 12 protrudes rearward from a center portion of the acting member 11. The acting member 11 has an annular locking groove 11a. An end of the acting member 11 on a side opposite to the shaft 12 side has an outer peripheral portion with an inclined surface 11b. The inclined surface 11b decreases in diameter toward a front end of the acting member 11. The shaft 12 has a coupling recess 12a opened sideward.

The locking lever 6 includes a rotating shaft 13, a locking member 14, a thrust receiver 15, and a spring support piece 16. The locking lever 6 is rotatable about the rotating shaft 13 as a fulcrum.

An axial direction of the rotating shaft 13 is a lateral direction. The rotating shaft 13 is supported in a rotatable manner in the transmission case, for example.

The locking member 14 is continuous to one end of the rotating shaft 13 in the axial direction. The locking member 14 has, for example, a boomerang shape protruding upward, and has one end as a first engagement portion 14a and the other end as a second engagement portion 14b.

The locking member 14 includes an intermediate portion 14c continuous to the one end of the rotating shaft 13 in the axial direction. The locking member 14 is disposed above the acting member 11 of the parking piston 5. Either one of the first engagement portion 14a and the second engagement portion 14b selectively engage with the locking groove 11a of the acting member 11 in accordance with a rotation position of the locking lever 6.

The thrust receiver 15 protrudes from an intermediate portion of the rotating shaft 13 in the axial direction and has, for example, a flat plate shape.

The spring support piece 16 protrudes from the other end of the rotating shaft 13 in the axial direction and has, for example, a flat plate shape.

An urging spring 17 is supported around the locking lever 6. The urging spring 17 is, for example, a torsion coil spring and has a coil 17a into which the rotating shaft 13 is inserted. A first arm 17b of the urging spring 17 on one side engages with the spring support piece 16. A second arm 17c of the urging spring 17 on the other side engages with a component such as a portion of the transmission case.

The urging spring 17 applies urging force to the locking lever 6 in a direction to make the first engagement portion 14a of the locking member 14 approach the acting member 11.

Driving force applied by an actuator 18 causes the locking lever 6 to rotate in a direction reverse to the direction in which the urging force of the urging spring 17 is applied. Examples of the actuator 18 include a solenoid. The locking lever 6 is rotated in the following directions: a first rotating direction in which the urging force of the urging spring 17 causes the first engagement portion 14a to approach the acting member 11; and a second rotating direction in which the driving force applied by the actuator 18 causes the second engagement portion 14b to approach the acting member 11.

The actuator 18 includes a main body 18a and an actuation shaft 18b. The actuation shaft 18b is moved relative to the main body 18a. When the actuation shaft 18b is moved to protrude from the main body 18a, the actuation shaft 18b presses the thrust receiver 15, and the driving force applied by the actuator 18 causes the locking lever 6 to rotate against the urging force of the urging spring 17 to make the second engagement portion 14b of the locking member 14 approach the acting member 11. Reversely, when the actuation shaft 18b is moved to retract into the main body 18a, the actuation shaft 18b is separated from the thrust receiver 15, and the urging force of the urging spring 17 causes the locking lever 6 to rotate to make the first engagement portion 14a of the locking member 14 approach the acting member 11.

A spring holder 19 is coupled to the coupler 8 of the parking rod 4. The spring holder 19 includes a columnar spring holding shaft 19a, a spring receiving flange 19b, and a coupling piece 19c. An axial direction of the columnar spring holding shaft 19a is the fore-and-aft direction. The spring receiving flange 19b extends from a front end portion of the spring holding shaft 19a. The coupling piece 19c protrudes forward from the spring receiving flange 19b. The spring holder 19 is coupled to the coupler 8 with an end portion of the coupler 8 on a side opposite to the cam 9 side being inserted into the coupling piece 19c. Consequently, the spring holder 19 is moved in the fore-and-aft direction along with the parking rod 4.

A spring member 20 is held on the spring holding shaft 19a of the spring holder 19. The spring member 20 is, for example, a compression coil spring. The spring member 20 has one end pressed against the spring receiving flange 19b and the other end pressed against a component such as a spring bearing 103 in the transmission case. Consequently, the spring member 20 applies urging force to the spring holder 19 and the parking rod 4 in a direction to move the spring holder 19 and the parking rod 4 forward.

The end portion of the coupler 8 of the parking rod 4 on the side opposite to the cam 9 side is inserted into the coupling piece 19c and coupled to an arm shifter 21. The arm shifter 21 includes an arm 21a extending substantially vertically, a turning fulcrum 21b, and a coupling end 21c. The turning fulcrum 21b and the coupling end 21c are respectively continuous to an upper end and a lower end of the arm 21a.

The arm 21a of the arm shifter 21 is coupled to the coupler 8 of the parking rod 4. The turning fulcrum 21b of the arm shifter 21 is coupled to one end of a shift shaft 22 in an axial direction. The arm shifter 21 is turned about the turning fulcrum 21b along with the shift shaft 22. The other end of the shift shaft 22 is coupled to an inhibitor switch not illustrated. The coupling end 21c of the arm shifter 21 is inserted into the coupling recess 12a of the parking piston 5 and coupled to the shaft 12 in a slidable manner.

Consequently, in accordance with movement of the parking piston 5, the arm shifter 21 is turned about the turning fulcrum 21b along with the shift shaft 22. When the arm shifter 21 is turned, the parking rod 4 is moved in the fore-and-aft direction in accordance with turning of the arm shifter 21.

As described above, the arm shifter 21 to which the parking rod 4 is coupled is coupled to the parking piston 5 with the coupling end 21c. Consequently, the urging force of the spring member 20 is also applied to the arm shifter 21 and the parking piston 5 through the spring holder 19, so that the spring member 20 urges the parking piston 5 to be moved forward.

Figure 3:
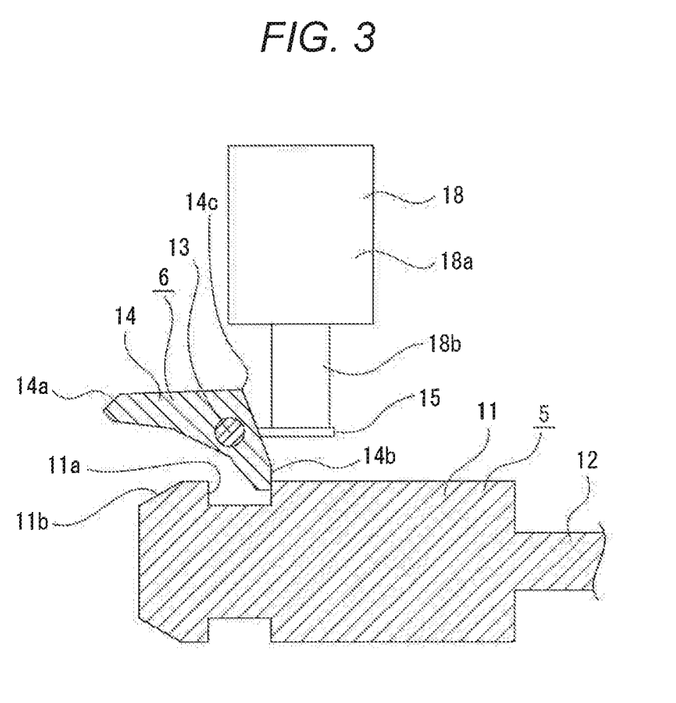
FIG. 3 is a cross-sectional view of a locking lever and other components in a state of the non-parking range.

In the parking mechanism 1 of the above-described configuration, when the vehicle is in one of the non-parking ranges, namely, the neutral range, the reverse range, and the drive range, the hydraulic mechanism applies hydraulic pressure to the parking piston 5, and the parking piston 5 is in the non-parking position, which is a rear movement end (see FIGS. 2 and 3). In the non-parking range, the actuation shaft 18b of the actuator 18 presses the thrust receiver 15 of the locking lever 6, and the second engagement portion 14b engages with the locking groove 11a of the parking piston 5. Thus, the parking piston 5 is held in the non-parking position.

In this manner, in the parking mechanism 1, when the second engagement portion 14b of the locking lever 6 engages with the locking groove 11a of the parking piston 5 and is locked, the parking piston 5 is held in the non-parking position. Consequently, even when a malfunction occurs in the hydraulic mechanism and decreases the hydraulic pressure, the parking piston 5 is not moved to the parking position, thereby preventing unintentional range shift.

At this time, the parking piston 5 is held in the non-parking position at the rear movement end. Therefore, the arm shifter 21 coupled to the parking piston 5 is at a rear turning end, and the parking rod 4 coupled to the arm shifter 21 is held at a rear movement end.

The parking rod 4 is held at the rear movement end. Therefore, the cam operating portion 3c of the parking pawl 3 is pressed against the first acting portion 9a of the cam 9 of the parking rod 4 by the urging force of the return spring 7, and the engagement portion 3b is below and apart from the gear portion 2a of the parking gear 2. Consequently, since the engagement portion 3b does not engage with the gear portion 2a, the parking gear 2 is in a rotatable state, and the drive shaft 100 to which the parking gear 2 is coupled is also in a rotatable state to allow the vehicle to travel.

When the vehicle is in one of the non-parking ranges and the shift lever is operated to the parking shift position or the parking switch is operated, the application of the hydraulic pressure to the parking piston 5 is stopped. At this time, simultaneously, the actuation shaft 18b of the actuator 18 retracts into the main body 18a (see FIG. 4).

Figure 4:
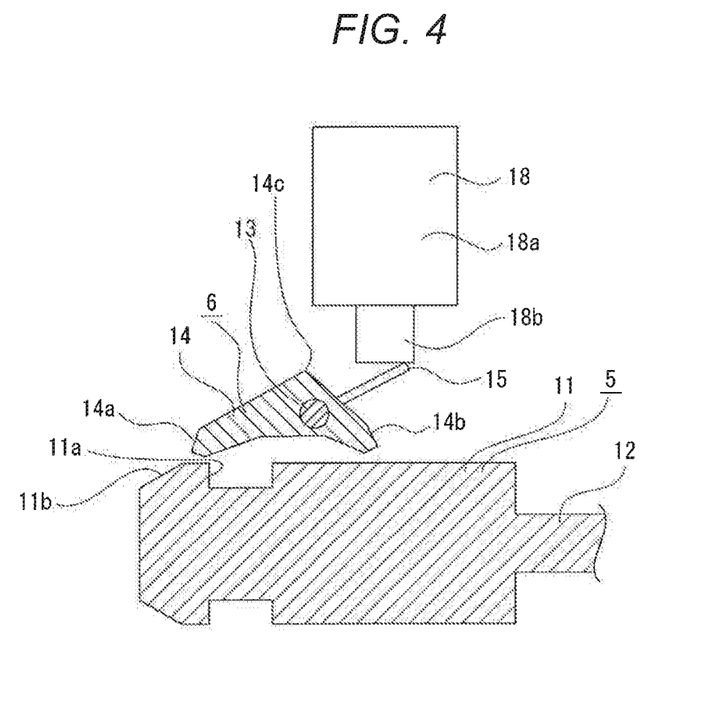
FIG. 4 is a cross-sectional view of the locking lever and a parking piston being operated.

Consequently, the locking lever 6 is rotated in the first rotating direction in which the urging force of the urging spring 17 makes the second engagement portion 14b move away from the locking groove 11a of the parking piston 5 so as to release the second engagement portion 14b from the locking groove 11a. The urging force of the spring member 20 causes the arm shifter 21 to turn to a front turning end to move the parking rod 4 forward and move the parking piston 5 toward the parking position.

When the parking piston 5 is moved toward the parking position, the locking lever 6 is rotated in the first rotating direction by the urging force of the urging spring 17. Partway through the rotation of the locking lever 6 in the first rotating direction, the parking piston 5 is moved to the parking position (see FIG. 5). When the parking piston 5 is moved to the parking position, the locking lever 6 engages with the locking groove 11a with the urging force of the urging spring 17 pressing the first engagement portion 14a against the parking piston 5. The actuation shaft 18b of the actuator 18 is moved away from the thrust receiver 15 of the locking lever 6.

Figure 5:
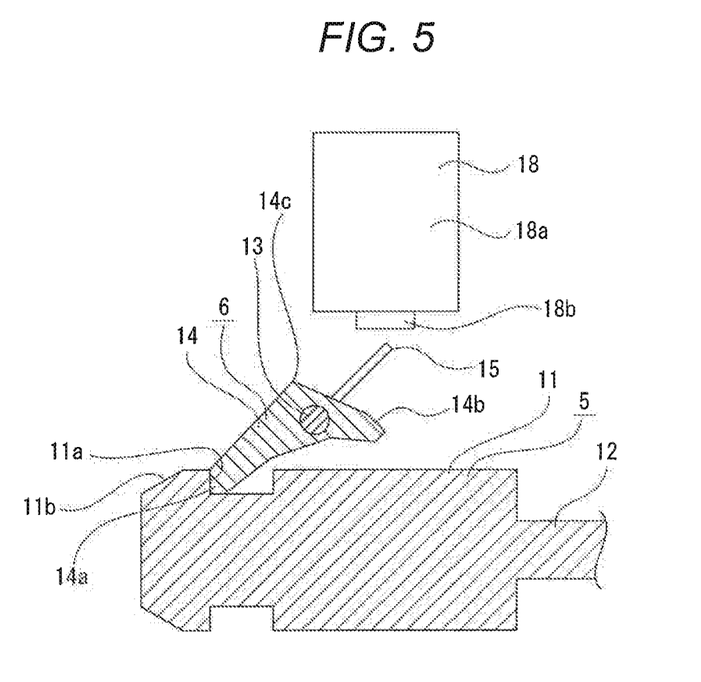
FIG. 5 is a cross-sectional view of the locking lever and other components in a state of a parking range.

With the first engagement portion 14a engaging with the locking groove 11a, the parking piston 5 is held in the parking position.

In this manner, in the parking mechanism 1, when the first engagement portion 14a of the locking lever 6 engages with the locking groove 11a of the parking piston 5 and is locked, the parking piston 5 is held in the parking position. Consequently, even when a malfunction occurs in the hydraulic mechanism and increases the hydraulic pressure, the parking piston 5 is not moved to the non-parking position, thereby preventing unintentional range shift.

It is noted that partway through the movement of the parking piston 5 from the non-parking position to the parking position, a factor such as a timing deviation in movement of the parking piston 5 and rotation of the locking lever 6 in the first rotating direction may bring the first engagement portion 14a of the locking lever 6 being rotated into contact with a tip of the parking piston 5. At this time, the first engagement portion 14a comes into contact with the inclined surface 11b (see FIG. 6).

Figure 6:
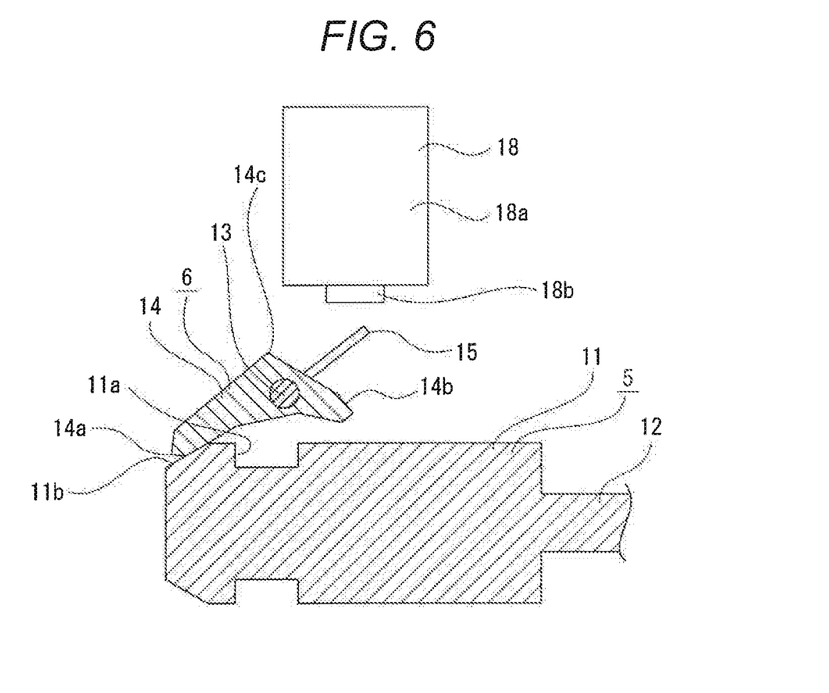
FIG. 6 is a cross-sectional view of the locking lever and the parking piston when a first engagement portion of the locking lever comes into contact with the parking piston while the parking piston is being moved from a non-parking position toward a parking position.

Consequently, when the parking piston 5 is moved forward toward the parking position, the first engagement portion 14a is slid on the inclined surface 11b and an upper surface of the parking piston 5 in sequence, and the locking lever 6 is rotated in the second rotating direction against the urging force of the urging spring 17. When the parking piston 5 is moved to the parking position, the urging force of the urging spring 17 causes the locking lever 6 to rotate in the first rotating direction to engage the first engagement portion 14a with the locking groove 11a (see FIG. 5).

As described above, the parking piston 5 has the inclined surface 11b on which the first engagement portion 14a is slidable while the parking piston 5 is being moved from the non-parking position to the parking position.

Consequently, in movement of the parking piston 5 from the non-parking position to the parking position, the first engagement portion 14a is slid on the inclined surface 11b to make the locking lever 6 rotatable in the second rotating direction against the urging force of the urging spring 17. With this configuration, irrespective of the position of the locking lever 6 relative to the parking piston 5, the locking lever 6 does not interfere with the movement of the parking piston 5. Thus, the parking piston 5 can be moved smoothly, and the first engagement portion 14a can smoothly engage with the locking groove 11a.

Figure 7:
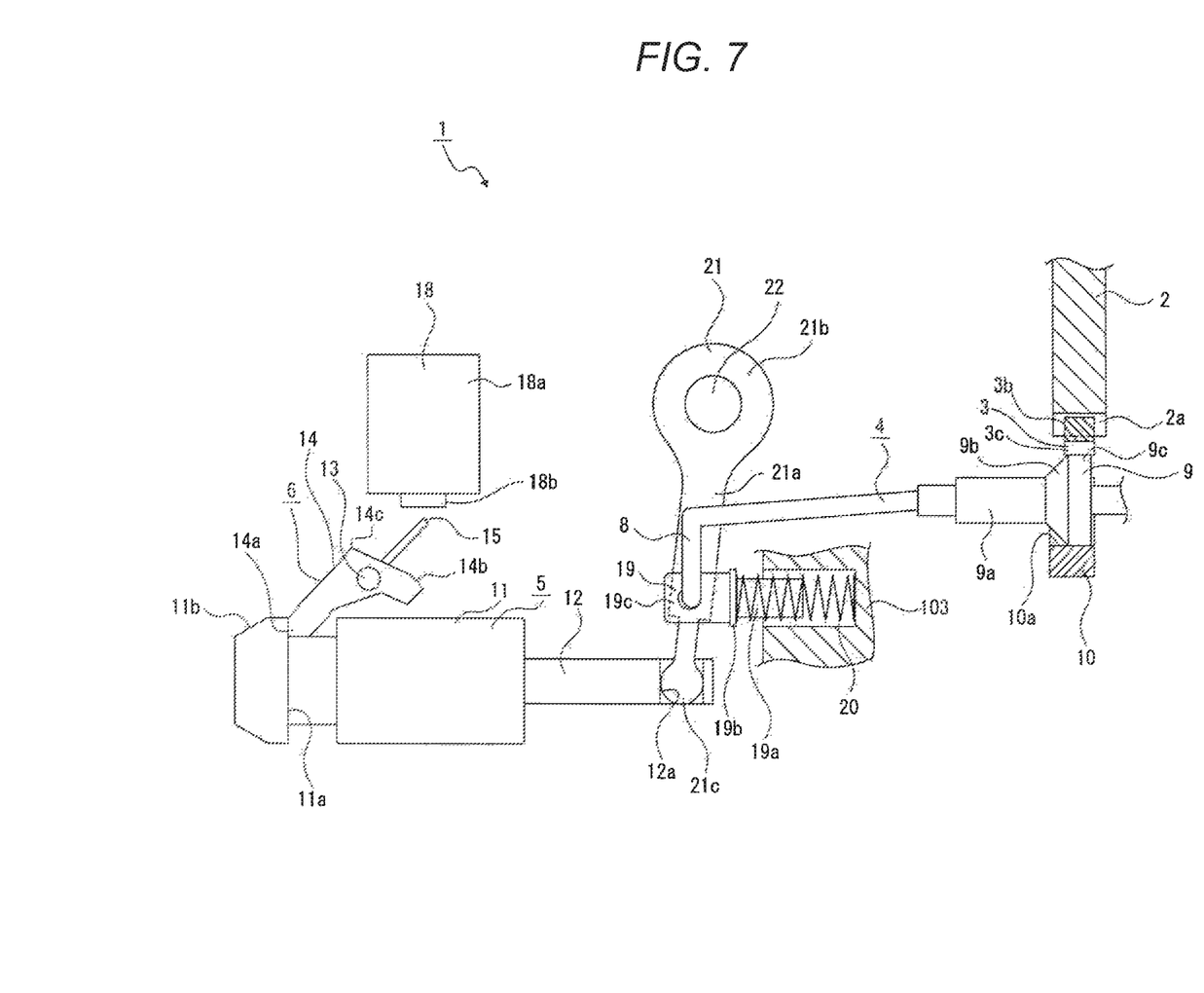
FIG. 7 is a side view of the parking mechanism in a state of the parking range.

In movement of the parking piston 5 to the parking position, the arm shifter 21 coupled to the parking piston 5 is turned to the front turning end, and the parking rod 4 coupled to the arm shifter 21 is moved to a front movement end. When the parking rod 4 is moved to the front movement end, the cam operating portion 3c is slid on the movement portion 9b and the second acting portion 9c of the cam 9 in sequence to turn the parking pawl 3 against the urging force of the return spring 7 to make the engagement portion 3b approach the gear portion 2a.

When the parking piston 5 is moved to the parking position, the engagement portion 3b engages with the gear portion 2a to restrict and stop rotation of the parking gear 2. This may also stop rotation of the drive shaft 100 to which the parking gear 2 is coupled and stop travel of the vehicle (see FIG. 7).

In this manner, when the engagement portion 3b engages with the gear portion 2a, rotation of the parking gear 2 is restricted, so that the vehicle shifts to the parking range.

As described above, the parking mechanism 1 includes the locking lever 6. The locking lever 6 has the first engagement portion 14a and the second engagement portion 14b. When the parking piston 5 is moved to the parking position, the first engagement portion 14a engages with the locking groove 11a. When the parking piston 5 is moved to the non-parking position, the second engagement portion 14b engages with the locking groove 11a. The locking lever 6 selectively locks the parking piston 5 in the parking position and the non-parking position.

Hence, when the first engagement portion 14a engages with the locking groove 11a of the parking piston 5 moved to the parking position, the locking lever 6 locks the parking piston 5 in the parking range. When the second engagement portion 14b engages with the locking groove 11a of the parking piston 5 moved to the non-parking position, the locking lever 6 locks the parking piston 5 in any of the ranges other than the parking range.

This configuration can eliminate individual different grooves, namely, a groove where the first engagement portion 14a engages and a groove where the second engagement portion 14b engages in the parking piston 5. Moreover, the first engagement portion 14a and the second engagement portion 14b are disposed on the identical locking lever 6 to simplify the structure of the parking mechanism 1 and to reduce installation space for the parking mechanism 1.

The locking lever 6 is rotatable in the first rotating direction to engage the first engagement portion 14a with the locking groove 11a and in the second rotating direction to engage the second engagement portion 14b with the locking groove 11a. The second rotating direction is reverse to the first rotating direction. The urging spring 17 urges the locking lever 6 in the first rotating direction.

Thus, with no force in the second rotating direction being applied to the locking lever 6, the urging spring 17 causes the locking lever 6 to rotate in the first rotating direction to lock the parking piston 5 in the parking position. With such a simple configuration, the parking piston 5 can be locked in the parking position.

The actuator 18 applies the driving force in the second rotating direction to the locking lever 6. The driving force applied by the actuator 18 causes the second engagement portion 14b to engage with the locking groove 11a.

Hence, the driving force applied to the locking lever 6 by the actuator 18 causes the locking lever 6 to rotate in the second rotating direction. The application of the driving force to the locking lever 6 by the actuator 18 is stopped to cause the urging force of the urging spring 17 to rotate the locking lever 6 in the first rotating direction. Thus, the locking lever 6 can be smoothly rotated in the first rotating direction and the second rotating direction.

The spring member 20 applies force to the parking piston 5 to move the parking piston 5 from the parking position to the non-parking position. Application of hydraulic pressure is stopped to move the parking piston 5 from the non-parking position to the parking position.

Thus, when the application of the hydraulic pressure to the parking piston 5 is stopped, the urging force of the spring member 20 moves the parking piston 5 from the parking position to the non-parking position. With such a simple configuration, the parking piston 5 can be moved to the parking position.

The invention claimed is:

1. A parking mechanism to be used in a vehicle, the parking mechanism comprising:
   a parking gear configured to be coupled to a drive shaft;
   a parking piston configured to be moved between a parking position to shift the vehicle to a parking range and a non-parking position to shift the vehicle to a non-parking range, the parking piston comprising a locking groove with first and second opposing side walls;
   a parking rod configured to be moved in conjunction with movement of the parking piston;
   a parking pawl comprising an engagement portion engageable with the parking gear, the parking pawl being configured to engage with and stop engaging with the parking gear in accordance with a move position of the parking rod; and
   a locking lever comprising
      a first engagement portion positioned at a first free end of the locking lever and configured to engage with the first opposing side wall of the locking groove when the parking piston is moved to the parking position, and
      a second engagement portion positioned at an opposite, second free end of the locking lever and configured to engage with the second opposing side wall of the locking groove when the parking piston is moved to the non-parking position, the locking lever being configured to selectively lock the parking piston in the parking position and the non-parking position.

2. The parking mechanism according to claim 1, wherein the locking lever is rotatable in a first rotating direction to engage the first engagement portion with the locking groove and in a second rotating direction to engage the second engagement portion with the locking groove, the second rotating direction being reverse to the first rotating direction,
   the parking mechanism further comprising:
   an urging spring configured to urge the locking lever in the first rotating direction.

3. The parking mechanism according to claim 2, wherein the parking piston comprises an inclined surface where the first engagement portion is slidable while the parking piston is being moved from the non-parking position to the parking position.

4. The parking mechanism according to claim 3, further comprising:
   a spring member configured to apply force to the parking piston to move the parking piston from the parking position to the non-parking position, the parking piston being configured to be moved from the non-parking position to the parking position by stopping application of hydraulic pressure.

5. The parking mechanism according to claim 2, further comprising:
   a spring member configured to apply force to the parking piston to move the parking piston from the parking position to the non-parking position, the parking piston being configured to be moved from the non-parking position to the parking position by stopping application of hydraulic pressure.

6. The parking mechanism according to claim 1, wherein the locking lever has a boomerang shape with the first and second engagement portions provided at the opposite free ends of the locking lever and to opposite sides of an intermediate angled portion.

7. The parking mechanism according to claim 1, wherein the locking lever has a central pivot portion and the first and second engagement portions are respectively arranged at opposite free ends of the locking lever as to have the pivot portion positioned between the opposite free ends.

8. A parking mechanism to be used in a vehicle, the parking mechanism comprising:
   a parking gear configured to be coupled to a drive shaft;
   a parking piston configured to be moved between a parking position to shift the vehicle to a parking range and a non-parking position to shift the vehicle to a non-parking range, the parking piston comprising a locking groove;
   a parking rod configured to be moved in conjunction with movement of the parking piston;
   a parking pawl comprising an engagement portion engageable with the parking gear, the parking pawl being configured to engage with and stop engaging with the parking gear in accordance with a move position of the parking rod; and
   a locking lever comprising
      a first engagement portion configured to engage with the locking groove when the parking piston is moved to the parking position, and
      a second engagement portion configured to engage with the locking groove when the parking piston is moved to the non-parking position, the locking lever being configured to selectively lock the parking piston in the parking position and the non-parking position, and
   wherein the locking lever is rotatable in a first rotating direction to engage the first engagement portion with the locking groove and in a second rotating direction to engage the second engagement portion with the locking groove, the second rotating direction being reverse to the first rotating direction, the parking mechanism further comprising:

an urging spring configured to urge the locking lever in the first rotating direction; and the parking mechanism, further comprising:

an actuator configured to apply driving force in the second rotating direction to the locking lever, the driving force applied by the actuator causing the second engagement portion to engage with the locking groove.

9. The parking mechanism according to claim 8, wherein the parking piston comprises an inclined surface where the first engagement portion is slidable while the parking piston is being moved from the non-parking position to the parking position.

10. The parking mechanism according to claim 9, further comprising:

a spring member configured to apply force to the parking piston to move the parking piston from the parking position to the non-parking position, the parking piston being configured to be moved from the non-parking position to the parking position by stopping application of hydraulic pressure.

11. The parking mechanism according to claim 8, further comprising:

a spring member configured to apply force to the parking piston to move the parking piston from the parking position to the non-parking position, the parking piston being configured to be moved from the non-parking position to the parking position by stopping application of hydraulic pressure.

12. A parking mechanism to be used in a vehicle, the parking mechanism comprising:

a parking gear configured to be coupled to a drive shaft;

a parking piston configured to be moved between a parking position to shift the vehicle to a parking range and a non-parking position to shift the vehicle to a non-parking range, the parking piston comprising a locking groove;

a parking rod configured to be moved in conjunction with movement of the parking piston;

a parking pawl comprising an engagement portion engageable with the parking gear, the parking pawl being configured to engage with and stop engaging with the parking gear in accordance with a move position of the parking rod; and a locking lever comprising a first engagement portion configured to engage with the locking groove when the parking piston is moved to the parking position, and a second engagement portion configured to engage with the locking groove when the parking piston is moved to the non-parking position, the locking lever being configured to selectively lock the parking piston in the parking position and the non-parking position, and the parking mechanism further comprising:

a spring member configured to apply force to the parking piston to move the parking piston from the parking position to the non-parking position, the parking piston being configured to be moved from the non-parking position to the parking position by stopping application of hydraulic pressure.

* * * * *